(12) United States Patent
Ohashi

(10) Patent No.: US 10,017,348 B2
(45) Date of Patent: Jul. 10, 2018

(54) WINDING DEVICE AND METHOD FOR DESIGNING WINDING DEVICE

(71) Applicant: TOYOTA JIDOSHA KABUSHIKI KAISHA, Toyota-shi, Aichi-ken (JP)

(72) Inventor: Fuminori Ohashi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 354 days.

(21) Appl. No.: 14/928,002

(22) Filed: Oct. 30, 2015

(65) Prior Publication Data

US 2016/0176669 A1    Jun. 23, 2016

(30) Foreign Application Priority Data

Dec. 19, 2014  (JP) .................. 2014-257790

(51) Int. Cl.
| | |
|---|---|
| *B65H 23/26* | (2006.01) |
| *B65H 23/16* | (2006.01) |
| *B65H 23/04* | (2006.01) |
| *B65H 20/34* | (2006.01) |
| *B65H 23/18* | (2006.01) |
| *B65H 23/188* | (2006.01) |

(52) U.S. Cl.
CPC ............. *B65H 23/26* (2013.01); *B65H 20/34* (2013.01); *B65H 23/048* (2013.01); *B65H 23/16* (2013.01); *B65H 23/1806* (2013.01); *B65H 23/1888* (2013.01); *B65H 2511/172* (2013.01); *B65H 2513/108* (2013.01); *B65H 2515/31* (2013.01); *B65H 2801/72* (2013.01)

(58) Field of Classification Search
CPC ...... B65H 23/048; B65H 23/16; B65H 23/26; B65H 23/1806; B65H 23/1888; B65H 20/34; B65H 2511/172; B65H 2515/31; B65H 2801/72
See application file for complete search history.

(56) References Cited

FOREIGN PATENT DOCUMENTS

| | | |
|---|---|---|
| JP | 2009256052 A | 11/2009 |
| JP | 2012-151064 A | 8/2012 |
| JP | 2013-191411 A | 9/2013 |

*Primary Examiner* — William E Dondero
(74) *Attorney, Agent, or Firm* — Sughrue Mion, PLLC

(57) ABSTRACT

Provided is a winding device capable of speeding up a winding operation while ensuring a winding quality. A feed roller feeds a sheet-like member. A take-up roller takes up the sheet-like member. Each roller guides transportation of the sheet-like member between the feed roller and the take-up roller. A sum of moments of inertia of each free roller is determined so that a variation in a tension applied to the sheet-like member is equal to or less than 16.7 [N/m].

5 Claims, 8 Drawing Sheets

WINDING DEVICE AND METHOD FOR DESIGNING WINDING DEVICE

INCORPORATION BY REFERENCE

This application is based upon and claims the benefit of priority from Japanese patent application No. 2014-257790, filed on Dec. 19, 2014, the disclosure of which is incorporated herein in its entirety by reference.

BACKGROUND OF THE INVENTION

1. Field of the Invention

The present invention relates to a winding device and a method for designing a winding device.

2. Description of Related Art

In the case of processing a sheet (thin-film) metal member for a battery electrode member, a winding device that winds the processed member to prevent winding displacement or wrinkles from occurring is used.

An electrode winding device suitable for eliminating defective portions in positive and negative plates to improve the production yield has been proposed (Japanese Unexamined Patent Application Publication No. 2012-151064). When both a turn of a positive plate and a turn of a negative plate have no defective portion, the electrode winding device produces a wound electrode body by winding the positive plate, the negative plate, and a separator. When one of a turn of a positive plate and a turn of a negative plate has a defective portion, the electrode winding device produces a wound electrode body after the defective portion is removed by a defective portion removing device. Thus, the production yield can be increased.

A winding device that improves the quality of an obtained wound element by reducing a load on a separator at the initial stage of winding has also been proposed (Japanese Unexamined Patent Application Publication No. 2013-191411). In this winding device, the separator and an electrode sheet pass between a pair of nip rollers and are supplied to a winding unit. One of the pair of nip rollers is controlled by a servomotor. At the initial stage of winding, the nip rollers are torque-controlled so as to reduce the tension applied to the separator between a winding core and the nip rollers, thereby reducing the load on the separator.

SUMMARY OF THE INVENTION

However, the present inventor has found that the above-mentioned techniques have the following problems. In the winding devices, the tension applied to a member to be wound varies when the take-up rate varies. A large tension variation causes a deformation of a take-up roll, a phenomenon in which a sheet-like member floats from the take-up roll, tight winding, loosening, or the like. These phenomena cause the occurrence of winding displacement or wrinkling, leading to deterioration in winding quality. Therefore, in the above-mentioned winding devices, a variation in the winding rate is set to be within, for example, an acceleration/deceleration of 0.2 G, thereby preventing a deterioration in winding quality.

In other words, in a general winding device, a variation in the take-up rate is limited. Accordingly, the take-up rate cannot be rapidly changed, which is a rate-limiting factor for a winding operation. Thus, it is difficult to achieve both prevention of a deterioration in winding quality and speeding up of the winding operation.

A first exemplary aspect of the present invention is a winding device including: a feed roller that feeds a member to be wound; a take-up roller that takes up the member to be wound; and one or more rollers that guide transportation of the member to be wound between the feed roller and the take-up roller. A moment of inertia of the one or more rollers satisfies the following Expression (1) so that a variation $\Delta T$ in a tension applied to the member to be wound is equal to or less than 16.7 [N/m], $$\Delta T = \frac{\sum_{i=1}^{N} \left( \frac{IM_i \cdot \Delta \omega}{r_i} + RR_i \right)}{W} \leq 16.7 \tag{1}$$

where N represents the number of the one or more rollers; $\Delta \omega$ represents a maximum value of an angular acceleration of the one or more rollers; $IM_i$ represents a moment of inertia of an i (i is an integer that satisfies $1 \leq i \leq N$)-th roller of the one or more rollers; $r_i$ represents a radius of the i-th roller of the one or more rollers; $RR_i$ represents a rolling resistance of the i-th roller of the one or more rollers; and W represents a width of the member to be wound.

It is preferable that the winding device according to the first exemplary aspect of the invention further include a dancer that adjusts a tension of the member to be wound between the feed roller and the take-up roller. The moment of inertia of at least one of the one or more rollers that is provided between the dancer and the feed roller preferably satisfies the Expression (1). The moment of inertia of at least one of the one or more rollers that is provided between the dancer and the take-up roller preferably satisfies the Expression (1).

In the winding device according to the first exemplary aspect of the invention, it is preferable that the one or more rollers have the same moment of inertia, the same radius, and the same rolling resistance. A moment of inertia IM of the one or more rollers preferably satisfies the following Expression (2):

$$IM \leq \frac{r}{\Delta \omega} \left( \frac{16.7 \cdot W}{N} - RR \right) \tag{2}$$

where r represents a radius of the one or more rollers, and RR represents a rolling resistance of the one or more rollers.

In the winding device according to the first exemplary aspect of the invention, when the maximum value $\Delta \omega$ of acceleration/deceleration of winding is 718.7 [rad/s$^2$]; the rolling resistance RR of the roller is 0.0049 [N]; the radius r of the roller is 0.015 [m]; and the width W of the member to be wound is 0.12 [m], a sum N·IM of moments of inertia of the one or more rollers is preferably equal to or less than $4.16 \times 10^{-5}$ [kg·m$^2$].

A second exemplary aspect of the present invention is a method for designing a winding device, including: disposing a feed roller that feeds a member to be wound; disposing a take-up roller that takes up the member to be wound; disposing one or more rollers that guide transportation of the member to be wound between the feed roller and the take-up roller; and selecting the one or more rollers so that a variation $\Delta T$ in a tension applied to the member to be wound when a take-up rate of the member to be wound varies is equal to or less than 16.7 [N/m] and a moment of inertia of the one or more rollers satisfies the following Expression (3):

$$\Delta T = \frac{\sum_{i=1}^{N}\left(\frac{IM_i \cdot \Delta\omega}{r_i} + RR_i\right)}{W} \leq 16.7 \qquad (3)$$

where N represents the number of the one or more rollers; Δω represents a maximum value of an angular acceleration of the one or more rollers; $IM_i$ represents a moment of inertia of an i (i is an integer that satisfies 1≤i≤N)-th roller of the one or more rollers; $r_i$, represents a radius of the i-th roller of the one or more rollers; $RR_i$ represents a rolling resistance of the i-th roller of the one or more rollers; and W represents a width of the member to be wound.

According to the present invention, it is possible to provide a winding device capable of speeding up a winding operation while ensuring a winding quality.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Exemplary Embodiment

Figure 1:
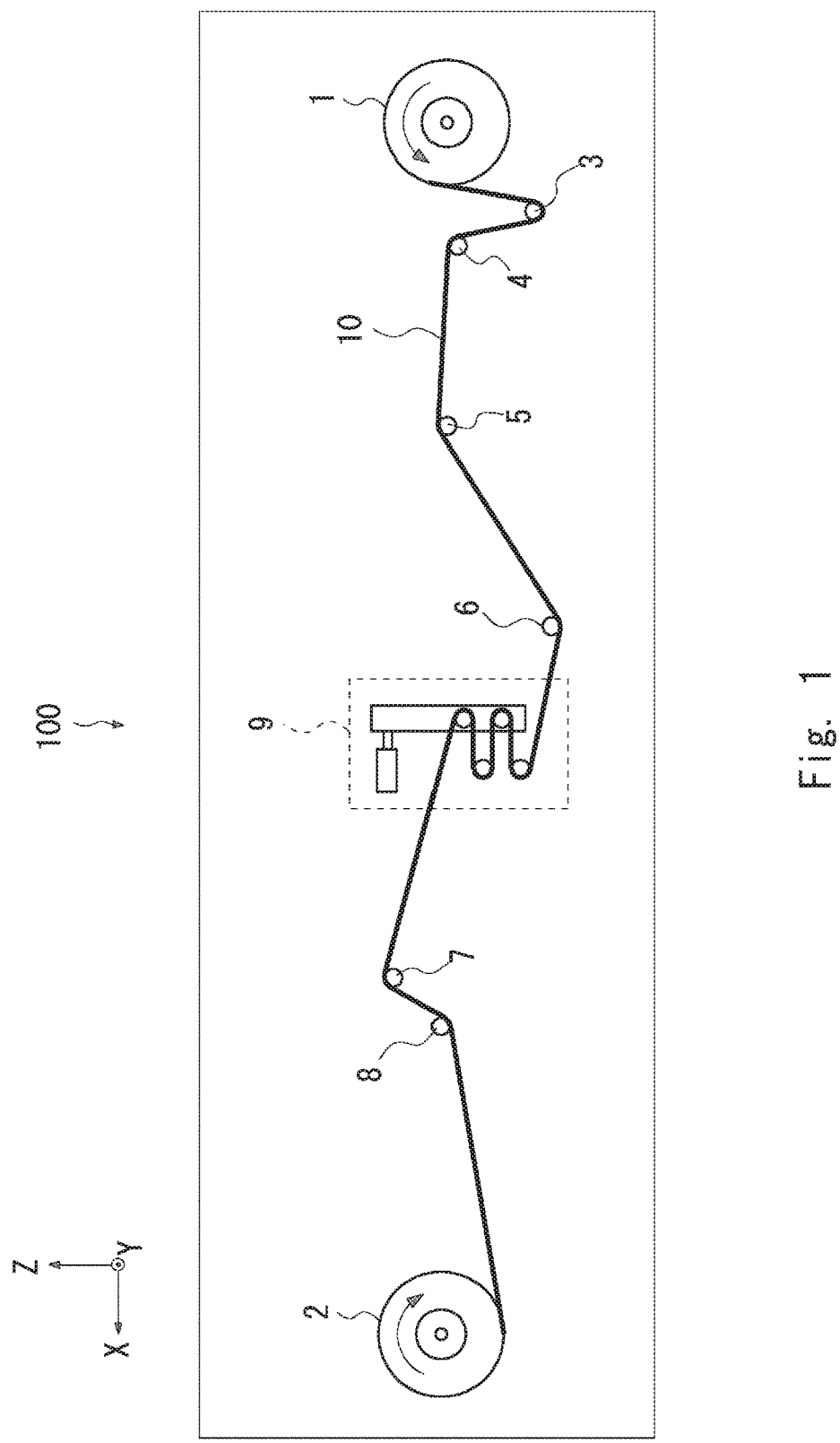
FIG. 1 is a front view showing a structure of a winding device according to a first exemplary embodiment.

A winding device 100 according to a first exemplary embodiment will be described. FIG. 1 is a front view showing the structure of the winding device 100 according to the first exemplary embodiment. The winding device 100 includes a feed roller 1, a take-up roller 2, free rollers 3 to 8, and a dancer 9.

A sheet-like member 10, which is a member to be wound, is wound around the feed roller 1. The feed roller 1 is rotatable about a Y direction as a rotation axis. Referring to FIG. 1, the feed roller 1 rotates counterclockwise to thereby feed the sheet-like member 10.

The transportation direction of the sheet-like member 10, which has been fed in a Z− direction from the feed roller 1, is turned into a Z+ direction at the free roller 3. After that, the transportation direction of the sheet-like member 10 is changed to an X+ direction by the free roller 4. Then, the vertical direction of the transportation direction of the sheet-like member 10 is changed from a Y+ direction to a Y− direction by the free roller 5. Further, the vertical direction of the transportation direction of the sheet-like member 10 is changed from the Y− direction to the Y+ direction by the free roller 6, so that the sheet-like member reaches the dancer 9.

Figure 2:
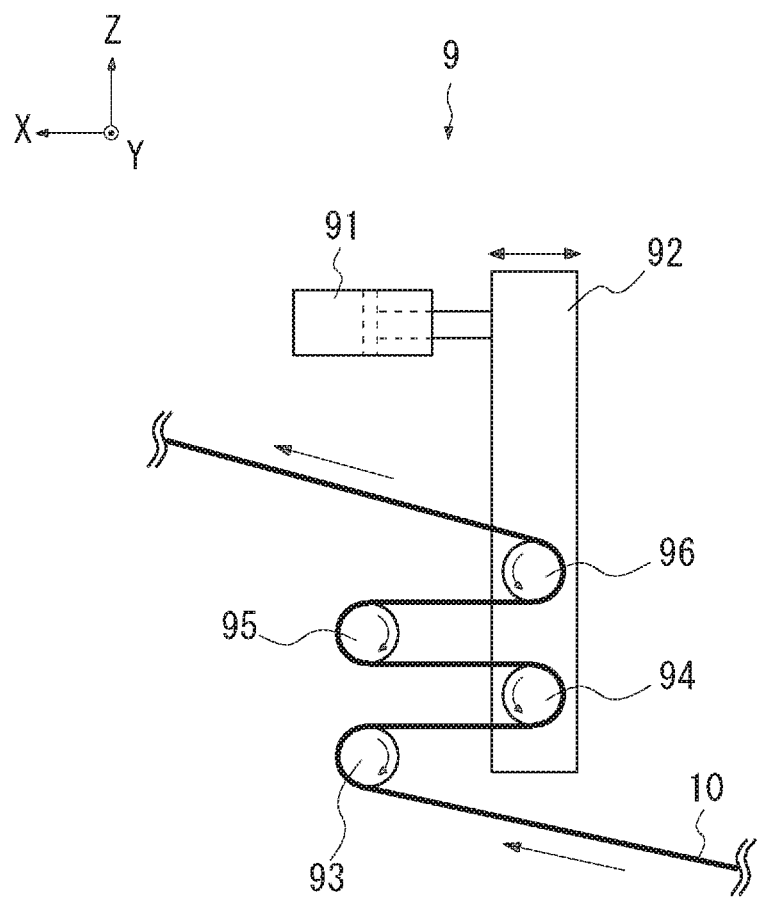
FIG. 2 is a front view schematically showing a structural example of a dancer.

The dancer 9 can hold the sheet-like member 10 so that a constant tension is applied to the sheet-like member 10, and can also transport the sheet-like member 10. FIG. 2 is a front view schematically showing a structural example of the dancer 9. The dancer 9 includes a cylinder 91, a shaft 92, and free rollers 93 to 96.

The free roller 93 is disposed in such a manner that the transportation direction of the sheet-like member 10, which has been fed to the dancer 9 in the X+ direction, is turned into an X− direction. The transportation direction of the sheet-like member 10, which has passed through the free roller 93, is turned into the X+ direction by the free roller 94 which is attached to the shaft 92. The transportation direction of the sheet-like member 10, which has passed through the free roller 94, is turned into the X− direction by the free roller 95. The transportation direction of the sheet-like member 10, which has passed through the free roller 95, is turned into the X+ direction by the free roller 96 which is attached to the shaft 92, and then the sheet-like member 10 is fed toward the take-up roller 2.

The cylinder 91 is a power source configured to be able to drive the shaft 92 along the X direction. The cylinder 91 adjusts the position of the shaft 92 in the X direction, thereby adjusting the distance between the free rollers 93 and 95, and the free roller 94 and 96. Thus, the dancer 9 can maintain the tension applied to the sheet-like member 10 at a constant value.

The vertical direction of the transportation direction of the sheet-like member 10, which has been fed from the dancer 9, is changed from the Y+ direction to the Y− direction by the free roller 7. After that, the vertical direction of the transportation direction of the sheet-like member 10 is changed by the free roller 8, and then the sheet-like member 10 reaches the take-up roller 2.

The take-up roller 2 is a roller that can be rotationally driven about the Y direction as a rotation axis. The take-up roller 2 rotates with a predetermined torque, thereby making it possible to take up the sheet-like member 10 having a tension.

It is known that in winding devices, a tension variation due to a variation in take-up rate affects the winding quality of the sheet-like member. The occurrence of a tension variation causes, for example, a deformation of the take-up roll, a phenomenon in which the sheet-like member floats from the take-up roll, tight winding, or loosening. These phenomena cause winding displacement or wrinkling. The term "winding displacement" herein used refers to a displacement of the sheet-like member in the rotational axis direction of the take-up roll.

Therefore, the winding device 100 is structured so as to prevent a tension variation due to a variation in take-up rate from affecting the winding quality of the sheet-like member. Specifically, the moment of inertia of the rollers, such as the free rollers disposed between the take-up roller and the feed roller, is set to an appropriate value, thereby suppressing a tension variation within a range that does not affect the winding quality of the sheet-like member.

In order to prevent a tension variation due to a variation in take-up rate from affecting the winding quality of the sheet-like member, the sheet-like member may be wound in such a manner that a variation in tension between the dancer 9 and the feed roller 1 (hereinafter referred to as "IN side") or between the dancer 9 and the take-up roller 2 (hereinafter referred to as "OUT side") is equal to or less than 16.7 [N/m]. Note that this condition was experimentally obtained. When the dancer 9 includes rollers, half of the rollers may be provided on the IN side and the other half of the rollers may be provided on the OUT side. However, if the dancer 9 includes an odd number of rollers, there is no need to provide half of the rollers on the IN side and the other half of the rollers on the OUT side. In this exemplary embodiment, assume that the acceleration/deceleration of winding is 1.1 G or less. In other words, the upper limit of the acceleration/deceleration of winding is 1.1 G.

A tension variation ΔT is represented by the following Expression (4).

$$\Delta T = \frac{\sum_{i=1}^{N} \left( \frac{IM_i \cdot \Delta \omega}{r_i} + RR_i \right)}{W} \leq 16.7 \quad (4)$$

where N represents the number of rollers; $IM_i$ represents a moment of inertia of an i (i is an integer that satisfies $1 \leq i \leq N$)-th roller; Δω represents a maximum value of angular acceleration of the roller corresponding to the acceleration/deceleration of 1.1 G; $r_i$ represents the radius of the i-th roller; $RR_i$ represents the rolling resistance of the i-th roller; and W represents the width of the sheet-like member 10.

Further, when all the rollers are the same, Expression (4) is expressed by the following Expression (5).

$$\Delta T = \frac{N \cdot \left( \frac{IM_i \cdot \Delta \omega}{r} + RR \right)}{W} \leq 16.7 \quad (5)$$

In this case, the moment of inertia IM of each roller may satisfy the following Expression (6).

$$IM \leq \frac{r}{\Delta \omega} \left( \frac{16.7 \cdot W}{N} + RR \right) \quad (6)$$

where r represents the radius of each roller, and RR represents the rolling resistance of each roller.

Now, considering a case where N=1 holds; the maximum value Δω of the angular acceleration of the roller corresponding to the acceleration/deceleration of 1.1 G is 718.7 [rad/s²]; the rolling resistance RR of each roller is 0.0049 [N]; the radius r of each roller is 0.015 [m]; and the width W of the sheet-like member 10 is 0.12 [m], the value of the moment of inertia of the roller is set to be within the range represented by Expression (7), thereby suppressing the tension variation Δω to be equal to or less than 16.7 [N/m].

$$\left( \frac{IM \cdot 718.7}{0.015} + 0.0049 \right) \cdot \frac{1}{0.12} \leq 16.7 \quad (7)$$
$$IM \leq 4.16 \times 10^{-5}$$

Accordingly, in this case, a free roller may be designed in such a manner that the moment of inertia IM of the free roller is set to be equal to or less than $4.16 \times 10^{-5}$ [kg·cm²]. If there are a plurality of rollers, the sum N·IM of the moments of inertia of the rollers is set to be equal to or less than $4.16 \times 10^{-5}$ [kg·m²], thereby making it possible to suppress the tension variation Δω to be equal to or less than 16.7 [N/m].

In the case of designing the winding device, the locations of the feed roller 1 and the take-up roller 2 are determined. Further, in the case of determining the locations of free rollers between the feed roller 1 and the take-up roller 2, the free rollers are selected so as to satisfy the above Expression (4) (that is, the specifications of the free rollers are determined), thereby making it possible to suppress the tension variation ΔT in the winding device to be equal to or less than 16.7 [N/m].

Examples will be described below.

EXAMPLE 1

Figure 3:
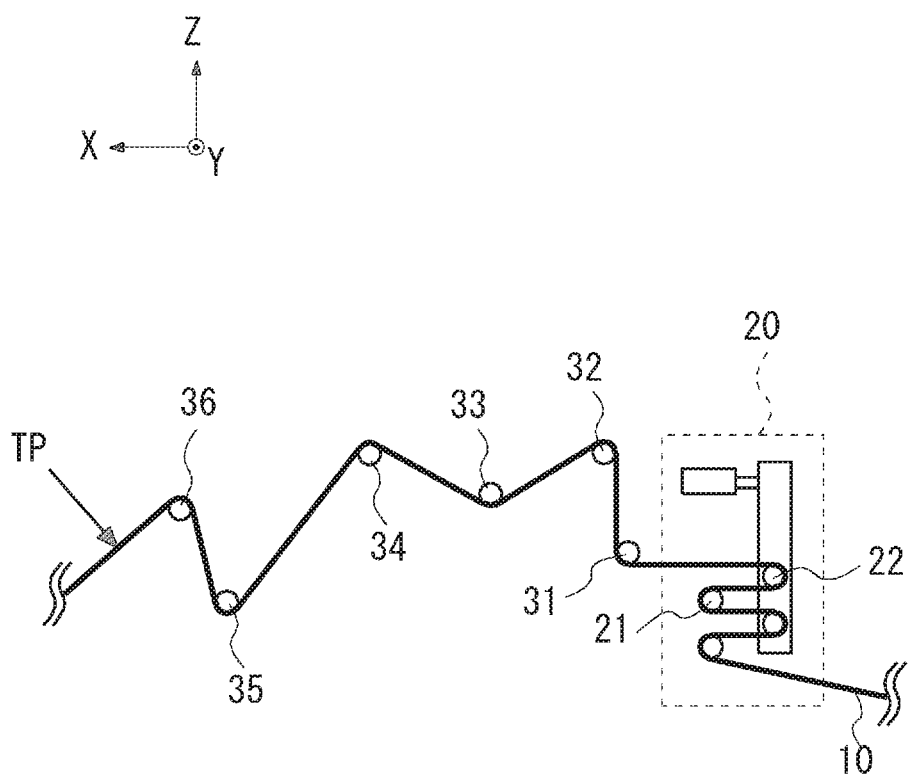
FIG. 3 is a diagram schematically showing a structure of a winding device according to Example 1.

In this example, assume that the number of free rollers provided between the dancer and the take-up roller is eight and the amount of increase in the tension per free roller when the take-up rate varies is 3.09 [N/m]. FIG. 3 is a diagram schematically showing a structure of a winding device according to Example 1. As for four rollers included in a dancer 20, free rollers 21 and 22, which are disposed near the take-up roller, are provided on the OUT side. Accordingly, Example 1 focuses attention on eight rollers, i.e., the free rollers 21 and 22 and free rollers 31 to 36. As shown in FIG. 3, a tension applied to the sheet-like member 10 at a position indicated by TP was measured.

Figure 4:
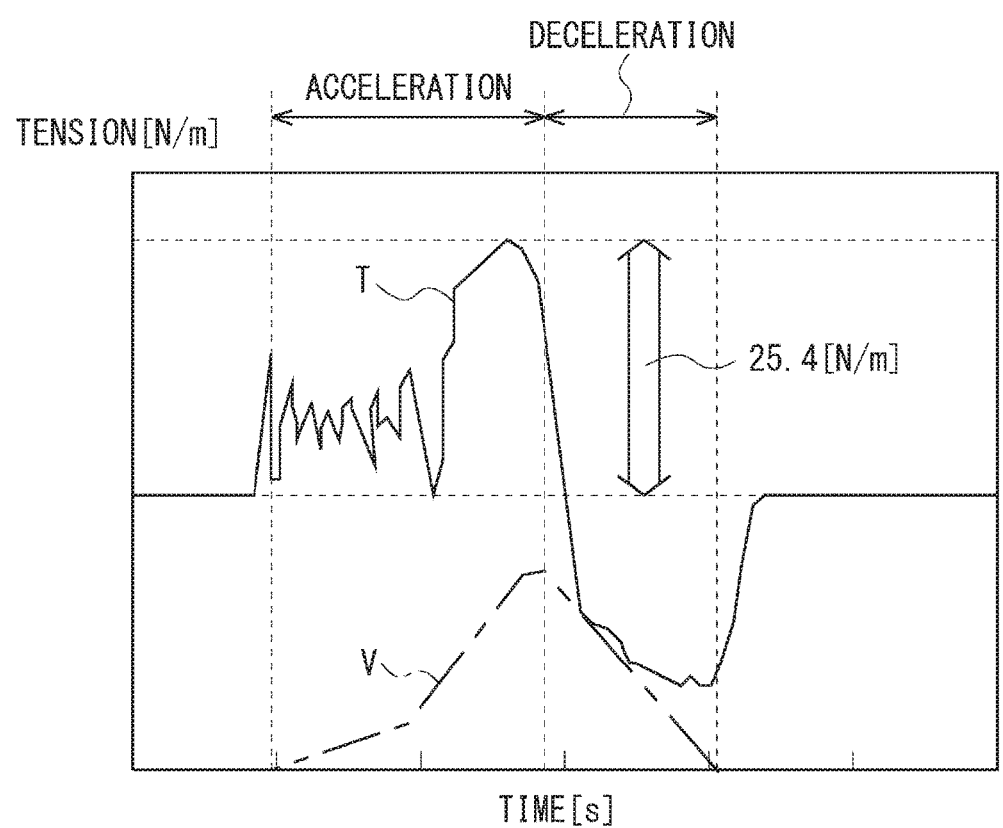
FIG. 4 is a graph showing a take-up rate and a tension in the winding device according to Example 1.

FIG. 4 is a graph showing a take-up rate V and a tension T in the winding device according to Example 1. In this case, the calculated variation in the tension T was 25.1 [N/m], and the tension variation actually measured in the structure of Example 1 was 25.4 [N/m]. Thus, it can be understood that the calculated tension variation matches the actual tension variation.

EXAMPLE 2

Figure 5:
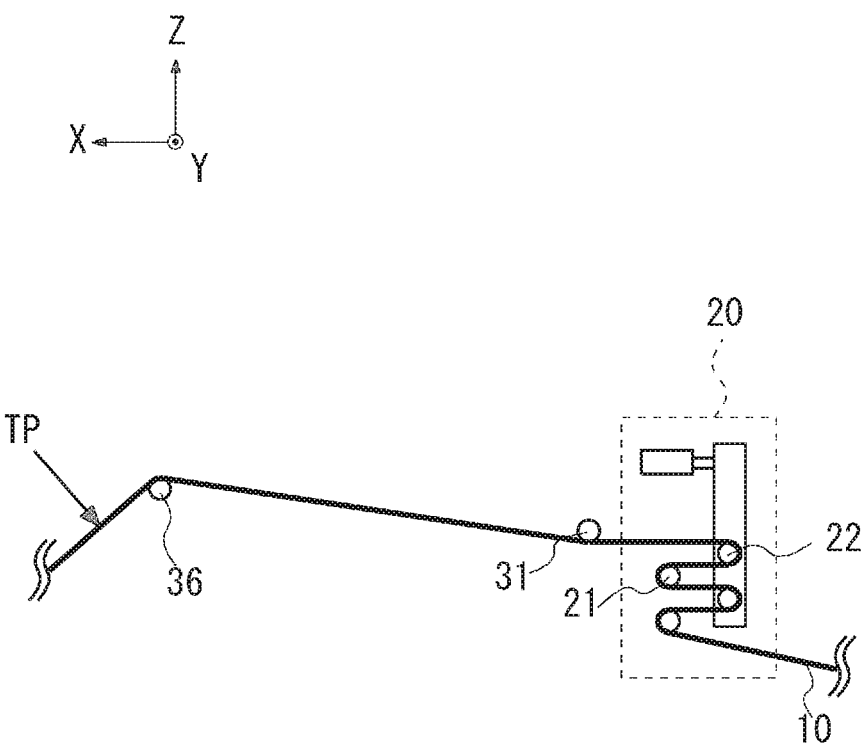
FIG. 5 is a diagram schematically showing a structure of a winding device according to Example 2.

In this example, assume that the number of free rollers provided between the dancer and the take-up roller is four and the amount of increase in the tension per free roller when the take-up rate varies is 3.09 [N/m], which is the same as the amount of increase in the tension per free roller in Example 1. FIG. 5 is a diagram schematically showing a structure of a winding device according to Example 2. As for four rollers included in the dancer 20, the free rollers 21 and 22, which are disposed near the take-up roller, are provided on the OUT side. Accordingly, Example 2 focuses attention on four rollers, i.e., the free rollers 21 and 22 and the free rollers 31 and 36. As shown in FIG. 5, a tension applied to the sheet-like member 10 at the position indicated by TP was measured.

Figure 6:
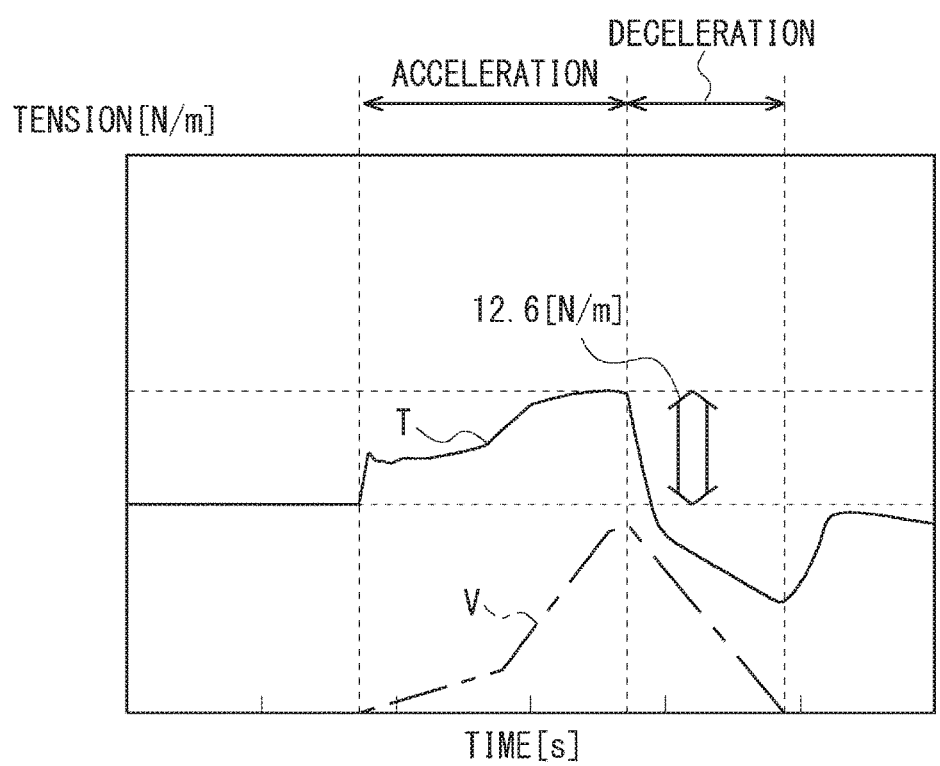
FIG. 6 is a graph showing a take-up rate and a tension in the winding device according to Example 2.

FIG. 6 is a graph showing the take-up rate V and the tension T in the winding device according to Example 2. In this case, the calculated variation in the tension was 12.5 [N/m], and the tension variation actually measured in the structure of Example 2 was 12.6 [N/m]. Thus, it can be understood that the calculated tension variation matches the actual tension variation.

EXAMPLE 3

Figure 7:
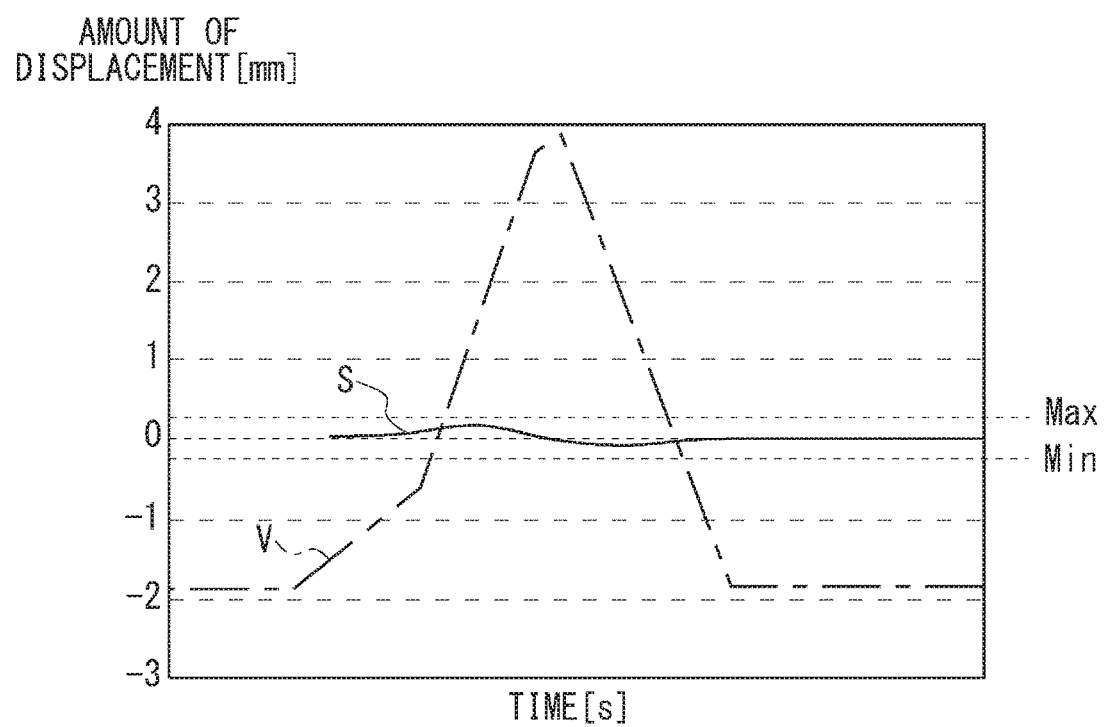
FIG. 7 is a graph showing a take-up rate and a winding displacement amount in a winding device according to Example 3.

In this example, assume that the number of free rollers provided between the dancer and the take-up roller is five and the sum of the moments of inertia of the free rollers is $6.3 \times 10^{-5}$ [kg·m²]. FIG. 7 is a graph showing the take-up rate V and a winding displacement amount S in a winding device according to Example 3. Note that the radius and the like of the rollers are determined as described above so that a variation in the tension per roller is set to be equal to or less than 16.7 [N/m]. In this case, the winding displacement amount S was equal to or less than ±0.1 mm, and therefore the winding displacement was sufficiently suppressed within the specifications (±0.3 mm between Max and Min as shown in FIG. 7).

COMPARATIVE EXAMPLE OF EXAMPLE 3

Figure 8:
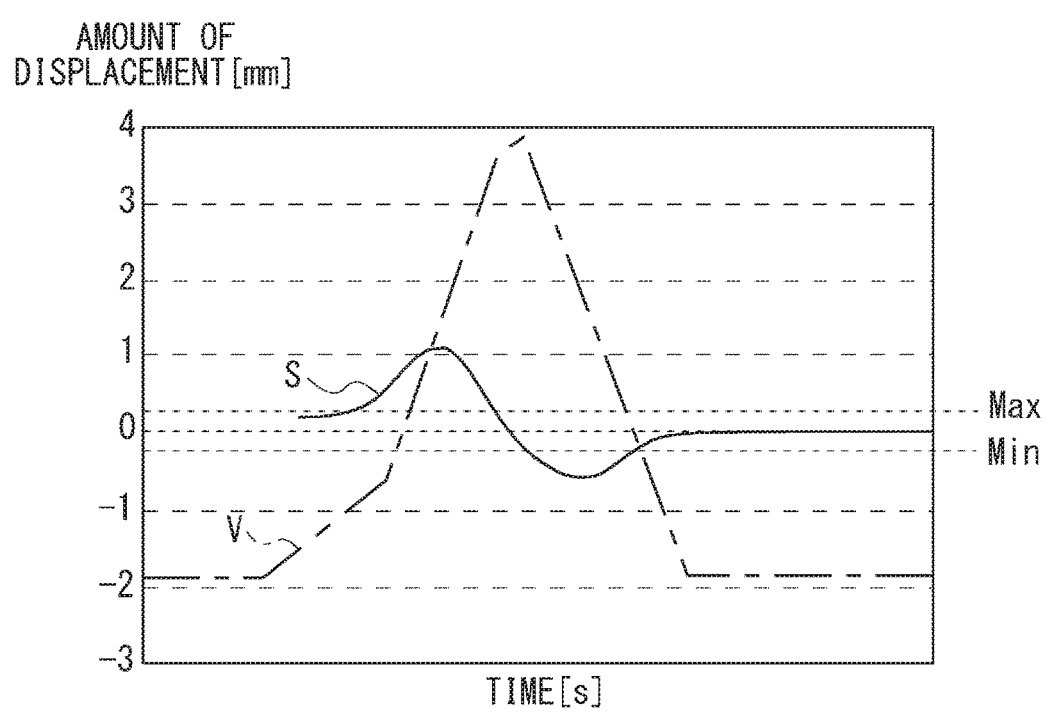
FIG. 8 is a graph showing a take-up rate and an amount of winding displacement in a winding device according to a comparative example.

A comparative example of Example 3 in which 15 free rollers are provided between the dancer and the take-up roller will be described. FIG. 8 is a graph showing the take-up rate V and the winding displacement amount S in a winding device according to the comparative example. When the moment of inertia per free roller is the same as that in Example 3, the sum of the moments of inertia of the free rollers is $19.0 \times 10^{-5}$ [kg·m$^2$]. In this case, it was confirmed that the winding displacement amount S was 0.8 mm, which was outside the specifications (±0.3 mm between Max and Min as shown in FIG. 8).

In this exemplary embodiment, in order to reduce the moment of inertia of each roller, it is desirable to form each roller with a lightweight (low-density) material having a high mechanical strength. For example, it is desirable that each roller be formed using carbon-fiber-reinforced plastic (CFRP) or the like.

OTHER EXEMPLARY EMBODIMENTS

Note that the present invention is not limited to the above exemplary embodiments, and can be modified as needed without departing from the scope of the invention. The number of free rollers in the above exemplary embodiments is only an example. The number of free rollers can be changed as needed, as long as at least one free roller is provided and a tension variation when the take-up rate varies can be suppressed to be equal to or less than 16.7 [N/m].

The radius and material of the free rollers described above are illustrated by way of example only. The radius and material of the free rollers can be changed as needed, as long as a tension variation when the take-up rate varies can be suppressed to be equal to or less than 2N.

The structure including the dancer described in the above exemplary embodiments is illustrated by way of example only. For example, the winding device can be structured in such a manner that no dancer is provided between the feed roller and the take-up roller and the moment of inertia of one or more free rollers between the feed roller and the take-up roller satisfies Expression (4).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A winding device comprising:
  a feed roller that feeds a member to be wound;
  a take-up roller that takes up the member to be wound; and
  one or more rollers that guide transportation of the member to be wound between the feed roller and the take-up roller, wherein a moment of inertia of the one or more rollers satisfies the following Expression (1) so that a variation ΔT in a tension applied to the member to be wound when a take-up rate of the member to be wound varies is equal to or less than 16.7 [N/m], $$\Delta T = \frac{\sum_{i=1}^{N} \left( \frac{IM_i \cdot \Delta \omega}{r_i} + RR_i \right)}{W} \leq 16.7 \quad (1)$$

where N represents the number of the one or more rollers; Δω represents a maximum value of an angular acceleration of the one or more rollers; $IM_i$ represents a moment of inertia of an i (i is an integer that satisfies 1≤i≤N)-th roller of the one or more rollers; $r_i$ represents a radius of the i-th roller of the one or more rollers; $RR_i$ represents a rolling resistance of the i-th roller of the one or more rollers; and W represents a width of the member to be wound.

2. The winding device according to claim 1, further comprising a dancer that adjusts a tension of the member to be wound between the feed roller and the take-up roller, wherein
  the moment of inertia of at least one of the one or more rollers that is provided between the dancer and the feed roller satisfies the Expression (1), and
  the moment of inertia of at least one of the one or more rollers that is provided between the dancer and the take-up roller satisfies the Expression (1).

3. The winding device according to claim 1, wherein
  the one or more rollers have the same moment of inertia, the same radius, and the same rolling resistance, and
  a moment of inertia IM of the one or more rollers satisfies the following Expression (2):

$$IM \leq \frac{r}{\Delta \omega} \left( \frac{16.7 \cdot W}{N} - RR \right) \quad (2)$$

where r represents a radius of the one or more rollers, and RR represents a rolling resistance of the one or more rollers.

4. The winding device according to claim 3, wherein when the maximum value Δω of acceleration/deceleration of winding is 718.7 [rad/s$^2$]; the rolling resistance RR of the roller is 0.0049 [N]; the radius r of the roller is 0.015 [m]; and the width W of the member to be wound is 0.12 [m], a sum N·IM of moments of inertia of the one or more rollers is equal to or less than $4.16 \times 10^{-5}$ [kg·m$^2$].

5. A method for designing a winding device, comprising:
  disposing a feed roller that feeds a member to be wound;
  disposing a take-up roller that takes up the member to be wound;
  disposing one or more rollers that guide transportation of the member to be wound between the feed roller and the take-up roller; and
  selecting the one or more rollers so that a variation ΔT in a tension applied to the member to be wound when a take-up rate of the member to be wound varies is equal to or less than 16.7 [N/m] and a moment of inertia of the one or more rollers satisfies the following Expression (3):

$$\Delta T = \frac{\sum_{i=1}^{N}\left(\frac{IM_i \cdot \Delta\omega}{r_i} + RR_i\right)}{W} \leq 16.7 \qquad (3)$$

where N represents the number of the one or more rollers; $\Delta\omega$ represents a maximum value of an angular acceleration of the one or more rollers; $IM_i$ represents a moment of inertia of an i (i is an integer that satisfies $1 \leq i \leq N$)-th roller of the one or more rollers; $r_i$ represents a radius of the i-th roller of the one or more rollers; $RR_i$ represents a rolling resistance of the i-th roller of the one or more rollers; and W represents a width of the member to be wound.

* * * * *